United States Patent [19]
Paine et al.

[11] 3,795,428
[45] Mar. 5, 1974

[54] TWO-PIECE INTERLOCKED SUPPORT/THRUST BEARINGS

[75] Inventors: John H. Paine, Peoria; Orville E. Kessinger, Jr., Mackinaw, both of Ill.

[73] Assignee: Caterpillar Tractor Co., Peoria, Ill.

[22] Filed: Jan. 10, 1972

[21] Appl. No.: 216,631

[52] U.S. Cl............................ 308/161, 308/237 R
[51] Int. Cl. ........................................... F16c 33/06
[58] Field of Search............... 308/161, 237 R, 165; 16/DIG. 27; 29/149.5 R, 149.5 C

[56] References Cited
UNITED STATES PATENTS

| | | | |
|---|---|---|---|
| 2,915,326 | 12/1959 | Mason | 308/36.1 |
| 3,713,714 | 1/1973 | Hill et al. | 308/237 |
| 1,649,258 | 11/1927 | Rummins | 308/165 |
| 2,821,444 | 1/1958 | Brown | 308/23 |
| 3,118,217 | 1/1964 | Gardner | 308/237 |
| 1,858,753 | 5/1932 | Taylor | 308/237 |
| 1,498,170 | 6/1924 | Jimerson | 308/DIG. 4 |
| 1,186,033 | 6/1916 | Perks | 308/237 |
| 3,624,881 | 12/1971 | Brown et al. | 29/149.5 |

*Primary Examiner*—Charles J. Myhre
*Assistant Examiner*—Barry Grossman
*Attorney, Agent, or Firm*—Fryer, Tjensvold, Phillips & Lempio

[57] ABSTRACT

A track roller bearing in two pieces is provided having interlocking means between each piece to provide a unitary, one-piece construction.

7 Claims, 5 Drawing Figures

TWO-PIECE INTERLOCKED SUPPORT/THRUST BEARINGS

BACKGROUND OF THE INVENTION

This invention relates to a two-piece bearing having interlocking means between each piece so as to accomodate both radial and axial loads encountered in a track roller assembly. More particularly, this invention relates to a bearing constructed by joining an axially extending support sleeve to a radially extending thrust washer. Still more particularly, this invention relates to interlocking means for joining the sleeve to the thrust washer.

Many applications require support bearings with interal thrust surfaces. For example, track rollers on track-type tractors typically utilize a pair of such bearings to absorb both radial and axial loads, which, in such equipment, can be severe. Each bearing takes the form of an axially directed sleeve portion to which is joined a radially directed flange portion. The bearings thus described rotatably support a track roller on a shaft such that both radial and axial loads are satisfactorily accomodated.

Prior art bearings have taken the form of integrally cast units wherein the entire bearing includes a sleeve portion which transcends to a radial flange or thrust surface portion. These prior art bearings have not proven to be entirely satisfactory in view of the relatively high cost incident to casting the integral thrust surface portion. One solution to this problem is the construction described in U.S. Pat. No. 3,624,881, issued Dec. 7, 1971, to Brown et al., and assigned to the assignee hereof. This solution takes the form of a two-piece bearing joined into a unitary whole by the process of friction welding.

A problem with the subject welded construction is engendered by the necessity of properly indexing the bearings within their supporting bushings so as to insure alignment of the oil holes in the respective elements. While this has not proved to be a problem where large shafts are concerned due to the apparent bonding of the bearings to the bushings during roll burnishing, it is still a problem in some cases. Another problem is the failure to provide alignment of the oil holes between the oil reservoir containing support bushing and the bearing will tend to cut off the supply of necessary lubricant and result in damage to the bearing, bushing and shaft.

SUMMARY AND OBJECTS OF THE INVENTION

It is to a solution of these and other problems that this invention is directed. The solution takes the form of a two-piece bearing having interlocking means for joining a sleeve portion to a thrust washer portion. Also provided are means for positively indexing the bearing oil holes with mating bushing lubricant holes and preventing rotation thereof which would destroy the lubricant hole alignment.

It is therefore an object of this invention to provide a two-piece bearing which is more economical to produce than other bearing constructions.

It is a further object of this invention to produce a two-piece bearing having interlocking means to join the pieces into a unit, which means also serve to prevent relative rotation between the pieces.

It is a further object of this invention to provide a two-piece bearing in the form of a support sleeve joined to a thrust washer by interlocking tabs and notches or the like.

It is a still further object of this invention to provide a two-piece track roller bearing for accomodating both radial and axial loads with means thereon to provide positive indexing of oil holes between the bearing and its support bushing.

Other objects and advantages are made apparent in the following description and accompanying drawings.

DETAILED DESCRIPTION

Figure 1:
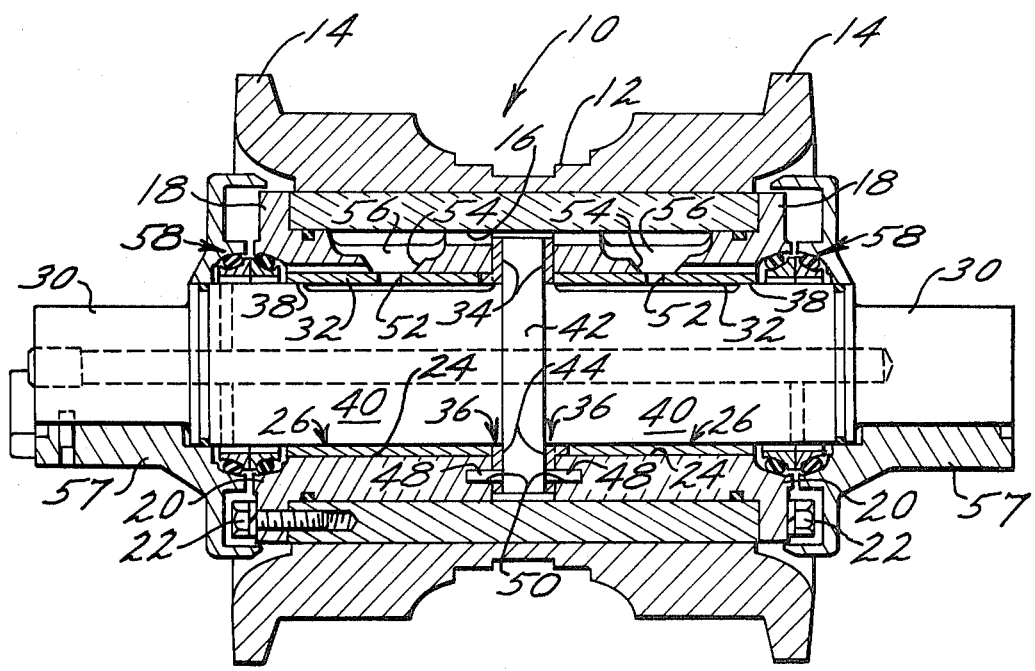
FIG. 1 is a partial cross-sectional view of a track roller having a pair of two-piece bearings mounted therein.

As shown in FIG. 1, a track roller assembly generally shown at 10 comprises a roller 12 having a generally cylindrical body portion and a generally radially directed flange or rim portion 14 at each end thereof. Within an axial bore 16 through the roller are a pair of opposed bushing assemblies 18 comprised of bushings 20 secured by a plurality of bolts 22. Each bushing, in turn, defines an axial bore 24. A bearing 26 is disposed within each bushing bore 24 so as to rotatably support a generally cylindrical shaft 28 having end portions 30 extending from bushing assemblies 18.

Each bearing comprises an axially directed sleeve portion 32 joined to a radially directed thrust washer or flange 34 by interlocking means shown generally at 36, which means will be more fully described below.

Sleeve portion 32 is conveniently made of relatively low-cost steel with relatively more expensive bronze facing 38 in the area of contact between the bearing sleeve portion and the shaft journals 40. Each bearing also has a thrust flange 34 in abutting relationship with a centrally disposed shaft flange 42. Each thrust flange 34 is conveniently constructed of steel with bronze facings 44 in like manner to the aforementioned sleeve portions. Axial thrust loads from shaft 28 are thus transmitted from flange 42 to bushings 18 by way of thrust flanges 34.

The bearings each contain a plurality of indexing holes 46 and dowels 48 fixedly mounted in bores 50 in bushings 20. These serve to both prevent relative rotation of the sleeve portion 32 through the locking means as well as to index a lubricant hole 52 of each bearing with a respective lubricant hole 54 of a corresponding bushing having therein an oil reservoir 56. The track roller assembly further comprises collar brackets 57 for attachment to a track roller frame (not shown) and seal assemblies shown generally at 58 for retaining roller lubricant.

Figure 2:
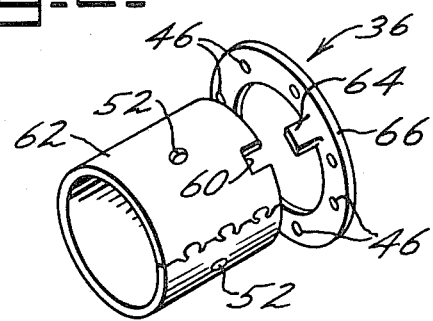
FIG. 2 is an isometric exploded view of the two-piece bearing of this invention illustrating the interlocking means for joining the pieces.

FIG. 2 shows the details of construction of a single two-piece bearing wherein the interlocking means comprise an axially oriented square notch 60 in one end of sleeve 62 which mates with a correspondingly shaped tab 64 of the thrust washer 66. Sleeve 62 is conveniently formed by bending a flat sheet of rectangular material into the general form of a tube and securing the abutting ends in some manner, e.g., the clinch butt joint shown.

Figure 3:
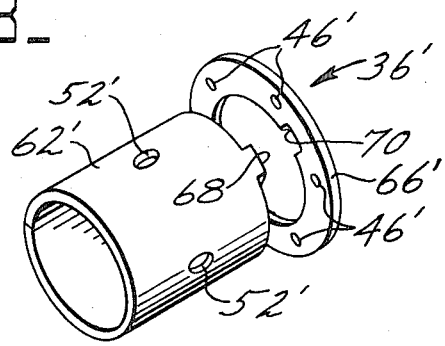
FIGS. 3–5 illustrate alternate embodiments of the two-piece bearing of FIG. 2, differing in the structure of the interlocking means for joining the pieces.
Figure 4:
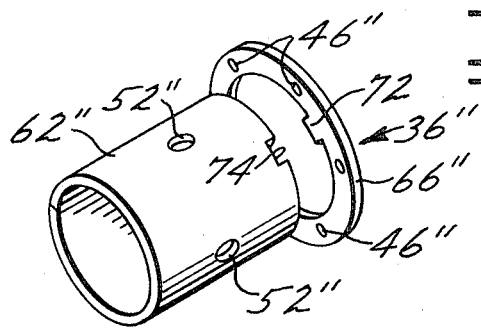
Figure 5:
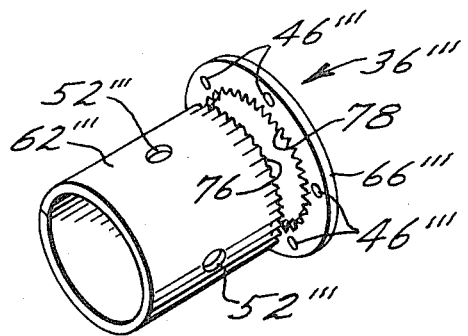

FIGS. 3–5 show alternate embodiments of the interlocking means. In the FIG. 3 embodiment, an axially directed rectangular tab 68 is fitted into a correspondingly shaped, axially directed notch 70 in the inner circumference of thrust washer 66'.

In like manner, FIG. 4 shows a radially inwardly directed rectangular tab 72 for engagement with correspondingly shaped notch 74. FIG. 5 shows an interlocking means in the form of serrations or tabs 76 around the end periphery of sleeve 62''' for mating with correspondingly shaped notches 78 in the inner periphery of thrust washer 66'''. It is to be understood that in each of the embodiments shown in FIGS. 1–4 the number of notches and tabs can range from a single pair to a plurality. It is to be further understood that the tabs are so dimensioned with respect to their corresponding notches so as to produce a force fit for purposes of retention.

It is to be understood that the foregoing description is merely illustrative of preferred embodiments of the invention and that the scope of the invention is not to be limited thereto, but is to be determined by the scope of the appended claims.

What is claimed is:

1. In a track roller assembly comprising a track roller having a first bore therethrough, a pair of bushings mounted in said bore, said bushings defining a second bore therethrough having an axis concentric with said first bore, a shaft contained within said first bore with the ends thereof extending from each end of said first bore, journal portions on said shaft being radially spaced from said second bore, the improvement which comprises a two-piece bearing fitted between each bushing and shaft journal portion, each bushing further including a lubricant hole adapted for directing lubricant to the bearing from a reservoir therein, said two piece bearing comprising a generally axially-directed sleeve portion having at least one lubricant hole therethrough adapted for mating with said bushing lubricant hole, and a generally radially directed thrust washer portion and tab means on one of said portions engaged in notch means on the other of said portions so as to form a unitary bearing adapted to accommodate radial and axial loads, said radially directed thrust washer portion of each bearing being fitted between its respective bushing and the shaft flange, and wherein positive indexing means are provided between said radially-directed flange and said bushing so as to index said lubricant holes into alignment and prevent rotation of said bearing.

2. The invention of claim 1 wherein said tab means comprise an axially directed square tab on said thrust washer portion mating with a correspondingly shaped axially directed notch on said sleeve portion.

3. The invention of claim 1 wherein said tab means comprise a axially directed rectangular tab on said sleeve portion mating with a correspondingly shaped radially directed notch on said thrust washer portion.

4. The invention of claim 1 wherein said tab means comprise a radially directed rectangular tab on said thrust washer mating with a correspondingly shaped axially directed notch on said sleeve portion.

5. The invention of claim 1 further including a bronze facing on said bearing sleeve.

6. The invention of claim 5 further including a bronze facing on said thrust washer portion.

7. In a track roller assembly comprising a track roller having a first bore therethrough, a pair of bushings mounted in said bore, said bushings defining a second bore therethrough having an axis concentric with said first bore, a shaft contained within said first bore with the ends thereof extending from each end of said first bore, journal portions on said shaft being radially spaced from said second bore.

the improvement which comprises a two-piece bearing fitted between each bushing and shaft journal portion, said two piece bearing comprising a generally axially directed sleeve portion, a generally radially directed thrust washer portion and tab means on one of said portions engaged in notch means on the other of said portions so as to form a unitary bearing adapted to accommodate radial and axial loads and wherein said tab means comprises serrations on an end periphery of said sleeve portion mating with a plurality of correspondingly shaped notches on said thrust washer portion.

* * * * *